July 2, 1957 R. W. HURSH 2,797,707
FILTER VALVE
Filed Aug. 27, 1954
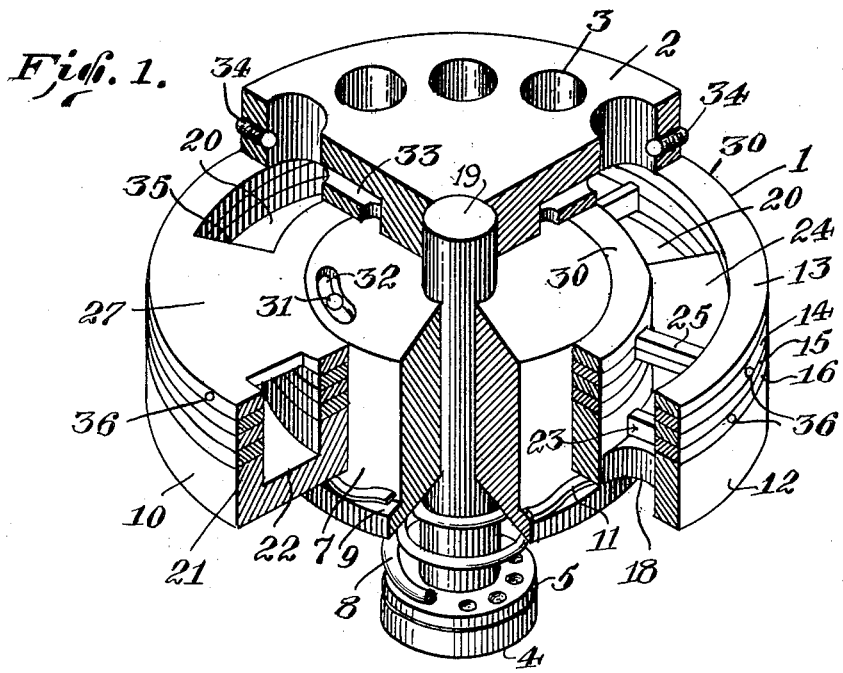
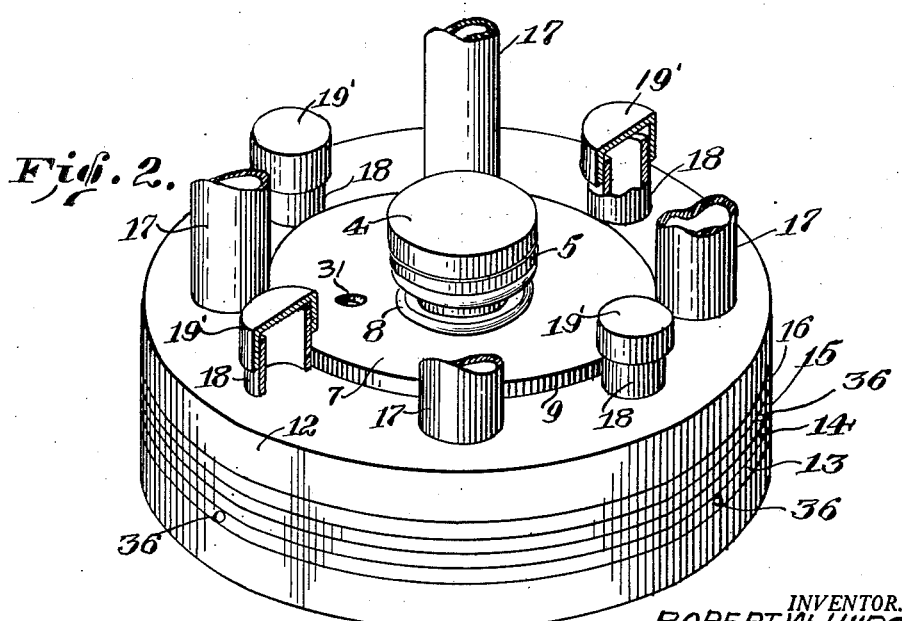
INVENTOR.
ROBERT W. HURSH
Attorney United States Patent Office
2,797,707
Patented July 2, 1957

2,797,707

FILTER VALVE

Robert W. Hursh, Coshocton, Ohio, assignor to Lukens Steel Company, Coatesville, Pa., a corporation of Pennsylvania Application August 27, 1954, Serial No. 452,690

6 Claims. (Cl. 137—633)

This invention relates to a filter valve for use with a continuous filter, and more specifically and preferably for use with a rotary horizontal continuous table type of filter as exemplified in the Fuhrmeister U. S. Patent No. 2,588,976 and Oliver U. S. Patent No. 1,335,695.

As is well known in this art, during the operation of horizontal rotary filters, it is desirable and often necessary to change or alter the adjustment of the valve associated therewith to accommodate and provide for varying characteristics of the material being processed. Usually a filter of this type is provided with a plurality of segmental filtrate compartments, and the filtrate is delivered to the filter bed, whereupon vacuum is applied to the filter to withdraw the filtrate from the various compartments into selected receiver means. Often it is necessary and desirable to adjust or vary the communication of the compartments with the receiver means so that certain filtrate from selected compartments will pass, under vacuum, to selected receivers. A valve structure has been utilized in the past for making this adjustment, and to the best of my knowledge, the adjustment operation has been difficult and time-consuming and generally requires disassembly of the valve structure.

With the foregoing in mind, it is an object of this invention to provide a filter valve associated with a continuous filter of the type described whereby the valve, interposed between the segmental compartments of the filter and the receiver means for the filtrate, may be adjusted without the necessity of disassembling the valve structure.

A further object of this invention is to provide a filter valve of the type described including improved means for adjusting the relative durations of the various portions of the filtration cycle.

Still another object of the invention is to provide a valve of the type described having associated therewith a plurality of bridges for directing the filtrate into different receivers and being provided with a port associated with one of the bridges whereby an upwardly directed fluid pressure or "blow-back" may be applied through the port.

Still another object of this invention is to provide a filter valve for use with a rotary horizontal continuous filter which is simple in construction, durable, and may be readily assembled or disassembled.

Other objects of the invention will be apparent upon considering the hereafter detailed description of the preferred embodiment shown in the drawings wherein:

Figure 1 is a top perspective view, partly in section and partly broken away, of the filter valve of this invention; and Figure 2 is a bottom perspective view, partly in section and partly broken away, of the valve.

As previously pointed out, the present valve is particularly adapted for use with a rotary horizontal continuous filter, and in this connection, for illustrative purposes and as an example, reference is made to the Fuhrmeister Patent 2,588,976 and the Oliver Patent No. 1,335,695 as typical filters in connection with which the valve of this invention may be employed. As in these patents, the valve body generally represented by numeral 1 will be positioned with respect to the filter bed in a manner similar to the valve body 17 of the Fuhrmeister patent and body 55 of the Oliver patent.

Of course, it is to be understood that the filter with which the present valve is used would be provided with suitable discharge or scraper means such as at 56 in the Fuhrmeister patent, and means would be provided to apply a vacuum to the material discharged on the filter bed throughout a major portion of each rotation of member 2 and the filter bed. For example, the vacuum may be supplied in conventional manner by maintaining the receiver means for the filtrate under sub-atmospheric pressure by connection with a suitable vacuum source. In this connection, reference is made to Figure 4 of Fuhrmeister wherein the vacuum-applied area and the discharge area is illustrated and substantially the same would be true in connection with the filter employed with the present valve.

Again referring to Figures 1 and 2, conventional means for rotating shaft 19 is employed, and this means may be connected to coupling or collar 4, numeral 5 representing suitable anti-friction thrust bearing means. Shaft 19 suports a stationary pilot element or block 7 by means of helical spring 8. Element 7 is of general cylindrical shape or configuration and is provided at its bottom with a radially outwardly extending flange 9. Positioned or interposed between valve member or plate 2 and flange 9 is a unit generally represented by numeral 10. The unit 10 is also maintained stationary and is supported in position by friction caused by bent washer means 11.

Unit 10 includes a collector ring 12 and a plurality of adjustable valve plates 13, 14, 15, and 16, all arranged as a lamination. Depending from the base of the collector ring at spaced intervals are necessary supports 17 and a plurality of outlet or receiver means 18 for the filtrate, each outlet means having a detachable cap 19' or the like shown as positionable thereon. The collector ring 12 is of substantial U-shape in cross section, the arms of the U being represented by numeral 21 and the base by numeral 22, the outlets 18 communicating at spaced intervals with the base 22. Also provided at selected intervals on the base 22 are dams 23 to maintain separation of the filtrates and to direct the filtrate into the various outlet tubes 18.

Laminations or valve plates 13, 14, 15 and 16 include circular portions or annuli 30 spaced apart to provide a circular opening 20 and the portions 30 are bridged for support at various intervals by bridge means such as shown at 24. If necessary or desired, slender spokes or webs may be employed between annuli 30 for further support. The purpose of each bridge means or section 24 will be explained in detail hereinafter, but it is primarily for the purpose of diverting flow of filtrate. Each bridge section 24 is provided with a dam 25 at one end thereof, for the purpose of directing filtrate discharged over a selected end of the bridge, and each dam projects upwardly from the bridge and its ends or sides are in close contact with the cut-out section of the valve plate or lamination immediately thereabove. These dams 25, as well as dams 23, may be made of flexible material, or the ends may be faced with flexible material such as a wiper construction, to insure non-leaking contact of the dams with the various valve plates or laminations. Having the dams of flexible material avoids the need of precise machining of valve plate cut-out areas.

The top valve plate or lamination 13 is not provided with bridge sections 24 at suitable intervals but, instead, has integral therewith a bridge area 27 and this bridge is substantially flush with the lower face of plate 2.

The purpose of bridge 27 is to perform the function of vacuum interruption as will be hereinafted described in detail.

Extending vertically through member 7 is a port 31 and port 31 communicates with an enlarged oval-shaped opening 32 in the top of member 7. Member 2 is provided with a passageway 33 adapted to communicate with port 31 and opening 32 during its travel thereover and a suitable plug is shown at 34. Again referring to Figure 4 of the Fuhrmeister patent, bridge 27 is comparable to the area of a cycle between the discharge zone and the vacuum zone, and it can be seen that this bridge will interrupt vacuum applied normally to the space 20 between the annuli 30 of each stationary valve plate 13, 14, 15 and 16. In a part of this area where vacuum is interrupted, reverse fluid pressure or blow-back connected to port 31, from a suitable source, from passageway 33 will pass upwardly through one of the ports 3 onto the filter bed and function to remove any residual sub-strata of cake from the bed whereby such removed cake will be simultaneously re-pulped with the incoming filter slurry which preferably is fed to the filter bed above area 27.

In operation, plate 2 will rotate with the filter compartments and throughout a major portion of each cycle vacuum will draw the filtrate through various ports 3, and by means of bridges 24, the filtrate will be directed to selected outlets or receivers 18. During a small portion of the cycle, comparable to the size of bridge 27, the vacuum will be interrupted, and blow-back pressure will be effected. Also, suitable discharge means, such as a conventional scroll, will be employed just prior to end 35 of bridge 27 to remove the majority of filter cake in the conventional manner. The cycle will continue in this manner, and filtrate will be discharged comparable to the manner described and shown in the Fuhrmeister and Oliver patents.

It is often desirable to adjust the relative durations of various portions of the filtration cycle, so that the number of openings 3 communicating with each outlet 18 may be varied. It is to be noted that each valve plate 13, 14, 15 and 16 is provided with an aperture 36, and the purpose of this aperture is to permit a suitable spanner tool or the like to engage therein and move the plates about member 7. By making this adjustment, the bridges associated with each valve plate will likewise be moved or re-positioned, and obviously this will alter the communication of ports 3 with tubes 18. For example, if the filter valve was originally set so that three consecutive ports 3 communicated with one outlet 18, an adjustment could be made whereby two of said three ports 3 communicate with outlet 18 and the next consecutive four ports 3, including one of said three ports, communicate with another outlet 18. Accordingly, it can be appreciated that the present valve structure permits ready adjustment of the various durations of the portions of the filtration cycle without the necessity of disassembling the valve structure.

If necessary, suitable means may be employed to lock plates 13, 14, 15 and 16 and element 7 in their adjusted position and against relative rotation. It is to be noted that since the member having port 32 is separate from valve plate 13, bridge 27 does not need to occupy the full height of the valve channel and provide a complete seal with the bottom surface of plate 2, as is the case for conventional construction, and this results in less likelihood of the blow-back fluid pressure being short-circuited to the vacuum portion or area of the cycle. Further, adjustment of plate 13 may obviously be made relative to the discharge scroll employed.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates. For example, the present valve could be readily reconstructed slightly by one skilled in the art for use with a filter of the horizontal drum type.

I claim:

1. A valve for use with a rotary continuous filter provided with segmental liquid compartments, comprising a member adapted to be mounted for rotary movement, said member having openings therein, a plurality of outlet means for receiving the liquid discharged through the openings, means interposed between the outlet means and the openings for varying the number of openings communicating with each outlet means, said last named means including a plurality of valve plates arranged in a lamination, each of said plates comprising spaced apart annuli to provide a common passageway therethrough, a determined number of said openings normally communicating through the passageway with each outlet means, and a plurality of said plates having bridge sections integral therewith and extending across said passageway for diverting flow of liquid through said passageway to each outlet means.

2. Apparatus as defined in claim 1 wherein there is provided means permitting adjustment of the location of each bridge section in said passageway to vary the number of openings communicating with each outlet means.

3. Apparatus as defined in claim 2 wherein said plates may be adjusted about the axis of rotation of the member.

4. Apparatus as defined in claim 1 wherein a dam extends across each bridge section to direct the liquid over a selected end of each bridge section.

5. A valve for use with a rotary continuous filter provided with segmental liquid compartments, comprising a stationary base, a vertically disposed central opening extending through said base, a collector ring arranged around said base, a plurality of outlets in said collector ring, a shaft rotatably mounted in said openings, a valve plate secured to the upper end of said shaft and rotatable therewith, said valve plate having a plurality of inlets arranged around said shaft, a plurality of independently movable flat disks arranged as a lamination between and in contact with said collector ring and said valve plate, said disks each having an annular passageway, each passageway being in liquid communication with each of the other passageways and said inlets and outlets, said disks each being independently adjustable around the axis of said shaft to vary the number of inlets in liquid communication with each of said outlets, and each of said disks having a bridge extending across its passageway for diverting liquid to selected outlets.

6. A valve as defined in claim 5, wherein said base is provided with an annular flange adjacent its lower end, and an annular spring washer is disposed between said flange and said collector ring to resiliently hold said disks against said valve plate.

References Cited in the file of this patent
UNITED STATES PATENTS

| | | |
|---|---|---|
| 1,335,695 | Oliver | Mar. 20, 1920 |
| 2,352,330 | Lee | June 27, 1944 |
| 2,588,976 | Fuhrmeister | Mar. 11, 1952 |
| 2,677,391 | Chellberg | May 4, 1954 |
| 2,687,806 | Becker | Aug. 31, 1954 |